United States Patent [19]

Sodeno

[11] Patent Number: 4,962,875
[45] Date of Patent: Oct. 16, 1990

[54] PARTS APPLYING APPARATUS

[75] Inventor: Toshiaki Sodeno, Toyama, Japan

[73] Assignee: Yoshida Kogyo K.K., Tokyo, Japan

[21] Appl. No.: 347,013

[22] Filed: May 4, 1989

[30] Foreign Application Priority Data

May 9, 1988 [JP] Japan ............................ 63-61408[U]

[51] Int. Cl.⁵ ........................................... A41H 37/10
[52] U.S. Cl. ....................................... 227/149; 227/30
[58] Field of Search ...................... 227/15, 18, 30, 110, 227/119, 149, 156

[56] References Cited

U.S. PATENT DOCUMENTS

| | | | |
|---|---|---|---|
| 3,503,549 | 3/1970 | Brunelle | 227/149 |
| 3,964,661 | 6/1976 | Schmidt et al. | 227/18 |
| 4,239,143 | 12/1980 | Johnson | 227/149 X |
| 4,736,880 | 4/1988 | Sodeno | 227/149 |
| 4,858,814 | 8/1989 | Francis | 227/149 |

FOREIGN PATENT DOCUMENTS 0135885  4/1985  European Pat. Off. .
52-13943  2/1977  Japan .

Primary Examiner—Paul A. Bell
Attorney, Agent, or Firm—Hill, Van Santen, Steadman & Simpson

[57] ABSTRACT

A parts applying apparatus for applying buttons, rivets and other fastening parts to a garment fabric is disclosed which essentially comprises a reciprocating ram, a punch including an annular flange, a punch holder carrying the punch and a parts gripper for releasably holding parts to be clamped onto fabric. The gripper is resiliently urged toward and held in sliding engagement with the ram. An elastic member such as of rubber is interposed between the punch flange and the punch holder to absorb part of the impact pressure exerted to the fabric during the parts clamping operation.

7 Claims, 4 Drawing Sheets

PARTS APPLYING APPARATUS

BACKGROUND OF THE INVENTION

1. Field of the Invention

This invention relates to an apparatus for applying fastening parts such as buttons, rivets, hooks and the like onto articles such as garment fabrics.

2. Prior Art

A typical prior art apparatus of the kind above described is disclosed for example in Japanese Laid-Open Patent Publication No. 52-13943, the disclosed apparatus comprising a reciprocating ram, a punch cooperating therewith in clamping parts such as buttons in place on a garment fabric and a gripper adapted to releasably hold the parts in position. The punch is provided at its lower end with four projecting lugs for supporting the parts thereon until the latter are clamped onto the fabric, in which instance the projecting lugs are brought into severe pressure contact with the fabric, resulting in undesirable impact marks on the fabric.

SUMMARY OF THE INVENTION

It is therefore the primary object of the invention to provide a parts applying apparatus for applying fastening parts onto garment fabrics which incorporates structural features enabling the parts to be held in the proper position and clamped in place on the fabric firmly and yet without leaving any pressure impact marks on the fabric.

The above and other objects of the present invention will be better understood from the following detailed description taken in conjunction with the accompanying drawings.

According to the invention, a parts applying apparatus comprises: a reciprocating ram; a punch concentrically secured to said ram and having an annular flange; a punch holder slidably accommodating said punch and having a plurality of downwardly projecting lugs adapted to releasably receive fastening parts for attachment to a fabric; a parts gripper comprising a pair of sleeves slidably fitted around said ram, each of said sleeves having a pair of upper and lower gripping jaws defining therebetween a transverse pocket for releasably receiving said parts and a vertical slit extending through said jaws for receiving said projecting lugs; and an elastic member interposed between said punch holder and said annular flange.

Many other advantages and features of the present invention will become manifest to those versed in the art upon making reference to the detailed description and the accompanying sheets of drawings in which preferred structural embodiments incorporating the principles of the present invention are shown by way of example.

DETAILED DESCRIPTION

Figure 1:
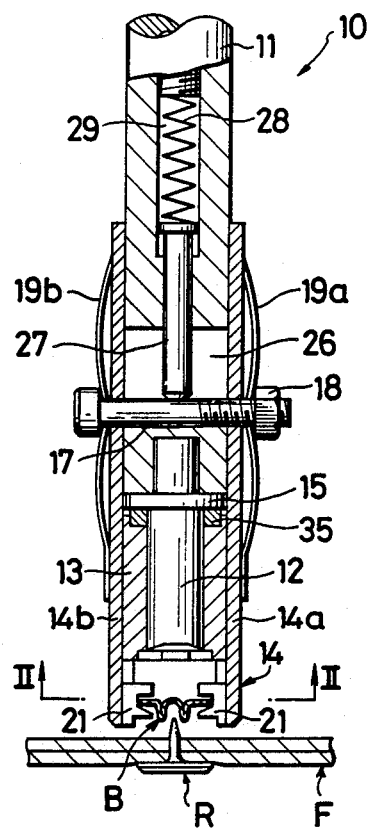
FIG. 1 is an elevational, partly sectional, view of a parts applying apparatus embodying the invention.
Figure 2:
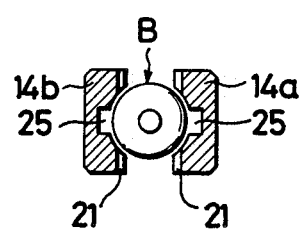
FIG. 2 is a cross-sectional view taken on the line II—II of FIG. 1.

Referring now to the drawings and FIG. 1, in particular, there is shown a parts applying apparatus 10 which essentially comprises a reciprocating ram 11, a punch 12 secured concentrically to the ram 11, a punch holder 13 slidably accommodating the punch 12 and a parts gripper 14 comprising a pair of sleeves 14a and 14b slidably fitted around the periphery of the lower portion of the ram 11.

The punch 12 has an annular flange 15 secured to the lower end of the ram 11 and a domed bottom 16 configured to snugly fit with a complimentarily shaped button or like parts.

The pair of sleeves 14a and 14b are fastened together in confronting relation by a bolt 17 and a nut 18 and slidably engaged with the annular peripheral wall of the lower portion of the ram 11. A pair of arcuate leaf springs 19a and 19b are attached to the sleeves 14a and 14b respectively to normally urge the latter toward the ram 11 and the punch holder 13.

Figure 3:
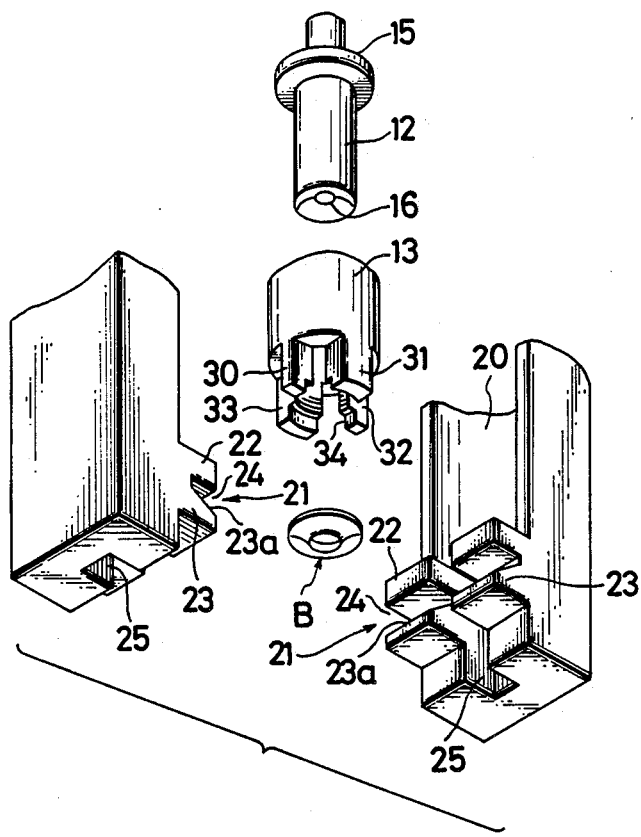
FIG. 3 is fragmentary perspective view of the apparatus of FIG. 1.

As shown in FIG. 3, the sleeves 14a and 14b are disposed in confronting relation to each other diametically across the ram 11 and each have an elongate slot 20 surrounding the ram 11. Each of the sleeves 14a, 14b has at its lower end portion a parts gripping means 21 comprising a pair of upper and lower gripping jaws 22 and 23 defining therebetween a transverse recess or pocket 24 for releasably receiving therein a button or other parts. Each of the lower jaws 23 has its upper surface 23' slightly inclined downwardly for purposes later to be described. A vertical through slit 25 is formed through the upper and lower jaws 22 and 23 in communication with the slot 20 for purposes hereafter to be described.

The ram 11 has an elongate axial slot 26 through which is extended the bolt 17 that holds the parts gripper 14 against the ram 11. A push pin 27 coaxial with the ram 11 has its upper end connected to a coil spring 28 accommodated in a bore 29 formed in the ram 11 and its lower end urged by the spring 28 into abutting engagement with the bolt 17.

Reference back to FIG. 3 shows the punch holder 13 as one cylindrically formed to receive slidably therein the punch 12 and having downwardly projecting lugs 30–33 circumferentially equally spaced apart, each of which lugs has an inwardly directed recess 34 for releasably receiving the periphery of a button B. The lugs 30 and 32, which are disposed diametrically across the punch holder 13, are dimensioned to fit into the vertical slits 25 in the respective sleeves 14a, 14b.

An elastic member 35 such as of rubber, spring and the like is interposed between the upper end surface of the punch holder 13 and the lower surface of the flange 15 of the punch 12.

Figure 4:
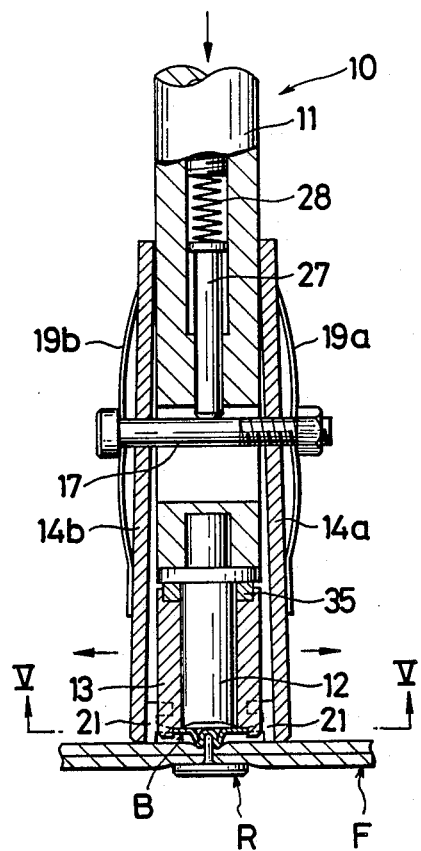
FIG. 4 is a view similar to FIG. 1 but showing the apparatus with a button about to be released.
Figure 5:
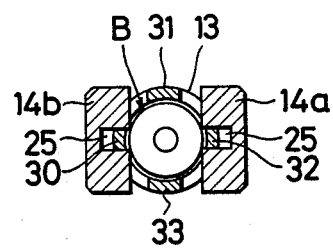
FIG. 5 is a cross-sectional view taken on the line V—V of FIG. 4.
Figure 6:
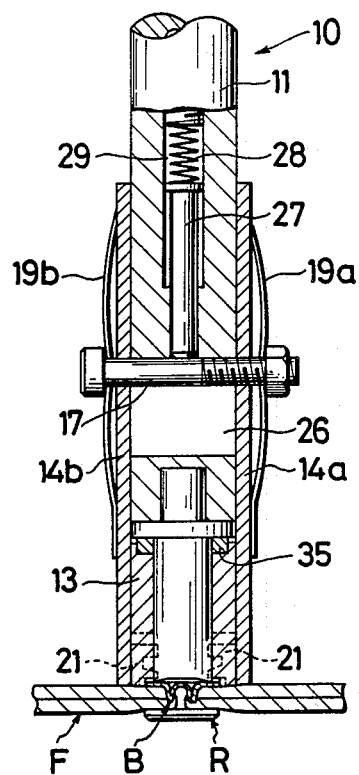
FIG. 6 is a view similar to FIG. 4 but showing the button clamped in place on the fabric.

The apparatus 10 according to the invention is illustrated for use in clinching the button B with a retainer tack R underlying a strip of fabric F. In the operation of the apparatus 10, the ram 11 is lowered with the button B placed in the pocket 24 of the parts gripper 14 until the lower end of the gripper 14 reaches the fabric F. While the gripper 14 is held in abutting engagement with the fabric F, the punch 12 and its holder 13 continue to descend with the ram 11 until the diametrically opposed lugs 30 and 32 enter and fit in the vertical slits 25 in the respective sleeves 14a and 14b, when the button B has its periphery received in the pocket 24 in the punch holder 13. As the button B is forced down by the punch holder 13, it slides down the inclined upper surfaces 23' of the lower gripping jaws 23, causing the opposed sleeves 14a and 14b to partly spread or move apart away from the punch holder 13 in particular in the direction of the arrow as shown in FIG. 4, until the lower end of the punch holder 13 reaches and stops at the surface of the fabric F. The punch 12 continues to descend until its domed bottom 16 engages the button B and forces the same into coupling engagement with the retainer tack R across the fabric F as shown in FIG. 6, whereupon the sleeves 14a and 14b are retracted by the tention of the springs 19a and 19b and re-engaged with the punch holder 13 and the ram 11.

In the parts applying operation above described, the impact pressure exerted by the punch holder 13 upon the fabric F is reduced to an absolute minimum on account of the presence of the elastic member 35 which is interposed between the punch holder 13 and the flange 15 of the punch 12 and which serves to absorb part of the stroke pressure of the ram 11, thus leaving substantially no pressure marks on the fabric F.

Another advantage of the apparatus 10 according to the invention, the button B can be retained in its proper horizontal position throughout the clamping operation by the projecting lugs 30-33 of the punch holder 13 which are located in advance of the punch 12 until the latter engages the button B.

Obviously, various modifications and variations of the present invention are possible in the light of the above teaching. It is therefore to be understood that within the scope of the appended claims the invention may be practiced otherwise than as specifically described.

What is claimed is:
1. A parts applying apparatus which comprises:
 (a) a reciprocating ram;
 (b) a punch concentrically secured to said ram and having an annular flange;
 (c) a punch holder slidably accommodating said punch and having a plurality of downwardly projecting lugs adapted to releasably receive fastening parts for attachment to a fabric;
 (d) a parts gripper comprising a pair of sleeves slidably fitted around said ram, each of said sleeves having a pair of upper and lower gripping jaws defining therebetween a transverse pocket for releasably receiving said parts and a vertical slit extending through said jaws for receiving said projecting lugs; and
 (e) an elastic member interposed between said punch holder and said annular flange.

2. An apparatus according to claim 1 wherein said lower gripping jaws has its upper surface downwardly inclined.

3. An apparatus according to claim 1 wherein said sleeves are normally urged toward said ram by leaf springs.

4. An apparatus according to claim 1 wherein said lugs each have an inwardly directed recess for releasably receiving the periphery of said parts.

5. An apparatus according to claim 1 wherein said lugs are located in advance of said punch until the latter engages said parts.

6. An apparatus according to claim 1 wherein said elastic member is made of rubber.

7. An apparatus according to claim 1 wherein said elastic member is a spring.

* * * * *